United States Patent
Suzuki et al.

(10) Patent No.: US 11,641,174 B2
(45) Date of Patent: May 2, 2023

(54) MOTOR DRIVING DEVICE

(71) Applicant: ROHM CO., LTD., Kyoto (JP)

(72) Inventors: Toshiya Suzuki, Kyoto (JP); Akio Yoshida, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 17/562,182

(22) Filed: Dec. 27, 2021

(65) Prior Publication Data

US 2022/0209704 A1    Jun. 30, 2022

(30) Foreign Application Priority Data

Dec. 29, 2020   (JP) .............................. JP2020-219825

(51) Int. Cl.
*H02P 29/02* (2016.01)
*H02P 29/024* (2016.01)

(52) U.S. Cl.
CPC .......... *H02P 29/027* (2013.01); *H02P 29/026* (2013.01); *H02P 2207/05* (2013.01)

(58) Field of Classification Search
CPC ... H02P 29/027; H02P 29/026; H02P 2207/05
See application file for complete search history.

(56) References Cited

U.S. PATENT DOCUMENTS

| | | | | |
|---|---|---|---|---|
| 9,503,000 | B2* | 11/2016 | Suzuki | H02P 6/16 |
| 2006/0138995 | A1* | 6/2006 | Sugita | B60K 6/44 |
| | | | | 318/811 |
| 2011/0254484 | A1* | 10/2011 | Dai | H02P 6/26 |
| | | | | 318/400.13 |
| 2012/0268047 | A1* | 10/2012 | Suzuki | H02P 6/16 |
| | | | | 318/400.04 |

FOREIGN PATENT DOCUMENTS

JP    2019103369    6/2019

* cited by examiner

*Primary Examiner* — Rina I Duda
(74) *Attorney, Agent, or Firm* — Fish & Richardson P.C.

(57) ABSTRACT

The present disclosure provides a motor driving device capable of inhibiting unstable driving of a motor even in the occurrence of a sudden fluctuation of a power supply voltage. The motor driving device includes a power supply voltage sudden fluctuation detector, a power supply voltage fluctuation width generator and a current limit value setting unit. The power supply voltage sudden fluctuation detector detects a sudden fluctuation in a direction in which the power supply voltage rises. The power supply voltage fluctuation width generator detects a fluctuation width of the power supply voltage. When the sudden fluctuation is detected by the power supply voltage sudden fluctuation detection unit, a current limit value of the current limit value setting unit is reduced from a normal value and corrected by the correction width corresponding to the fluctuation width of the detected power supply voltage.

20 Claims, 3 Drawing Sheets

MOTOR DRIVING DEVICE

TECHNICAL FIELD

The present disclosure relates to a motor driving device.

BACKGROUND

A conventional motor driving device of a direct-current (DC) motor is usually provided as a semiconductor device (integrated circuit (IC) package). In the motor driving device above, there are ones that drive the motor by means of PWM (pulse width modulation) according to a target speed indicated by a speed command signal so that the rotation speed of the motor becomes fixed (for example, patent document 1).

PRIOR ART DOCUMENT

Patent Publication

Patent document 1 Japan Patent Publication No. 2019-103369

SUMMARY OF THE PRESENT DISCLOSURE

Problems to Be Solved By the Disclosure

A power supply voltage is provided externally to drive a motor in the conventional motor driving device above. However, in events of temporary connection/disconnection of a power supply, a power supply in an unstable state or a power supply being switched to a reserved power supply, the power supply voltage may suddenly fluctuate in a rising direction. In this case, a motor driving current that drives the motor also increases suddenly. Accordingly, the motor accelerates suddenly because of a sudden increase in the motor torque, and there is a concern that the control based on an advance angle control or the detection of a motor rotation position may become unstable.

In addition, there is further a concern for an overcurrent generated due to the sudden increase in the motor driving current caused by the sudden fluctuation of the power supply voltage. Recently, in order to reduce costs of a power supply module, current capabilities of the power supply module are continuously developed, and the requirements for the prevention of overcurrent are further increased.

In view of the conditions above, it is an object of the disclosure to provide a motor driving device capable of inhibiting unstable driving of a motor even in the event of a sudden fluctuation of a power supply voltage.

Technical Means for Solving the Problem

A motor driving device according to an embodiment of the disclosure includes: a pulse-width modulation (PWM) duty generator, generating a PWM duty value based on a torque command signal according to a speed command signal; a PWM signal generator, generating a PWM signal based on the generated PWM duty value; a motor driving unit, to which a power supply voltage is supplied, and a drive signal is generated based on the generated PWM signal and supplied to a motor; a current detector, detecting whether a motor driving current flowing through the motor exceeds a current limit value; a power supply voltage sudden fluctuation detector, detecting a sudden fluctuation in a rising direction of the power supply voltage; a power supply voltage fluctuation amplitude generator, detecting a fluctuation amplitude of the power supply voltage; and a current limit value setting unit, correcting the current limit value so that the current limit value is lower than a normal value by a correction amplitude that corresponds to the fluctuation amplitude of the detected power supply voltage when the sudden fluctuation is detected by the power supply voltage sudden fluctuation detection unit, wherein the PWM duty generator generates the PWM duty value according to a detection result by the current detector (first configuration).

Alternatively, in the first configuration, the current detector compares a voltage signal converted from the motor driving current based on current/voltage conversion with a current limit reference voltage, the motor driving device further includes a power supply voltage fluctuation amplitude/referential voltage correction amplitude converter that converts the fluctuation amplitude of the detected power supply voltage into a referential voltage correction amplitude, and the current limit value setting unit corrects the current limit reference voltage according to the referential voltage correction amplitude (second configuration).

Alternatively, in the first or second configuration, after correction, the current limit value is returned to the normal value with a predetermined slope over a period of time (third configuration).

Alternatively, in the first or second configuration, the current limit value is set to be constant at a corrected value in a predetermined period after correction (fourth configuration).

Moreover, a motor driving device according to an embodiment of the disclosure includes: a PWM duty generator, generating a PWM duty value based on a torque command signal according to a speed command signal; a PWM signal generator, generating a PWM signal based on the generated PWM duty value; a motor driving unit, to which a power supply voltage is supplied, and a drive signal is generated based on the generated PWM signal and supplied to a motor; a power supply voltage sudden fluctuation detector, detecting a sudden fluctuation in a rising direction of the power supply voltage; a power supply voltage fluctuation amplitude generator, detecting a fluctuation amplitude of the power supply voltage; and a power supply voltage fluctuation amplitude/PWM duty correction amplitude converter, converting the fluctuation amplitude of the detected power supply voltage into a PWM duty correction amplitude, wherein the PWM duty generator includes: a command torque/PWM duty converter, converting a command torque indicated by the torque command signal into the PWM duty value; a PWM duty output unit, correcting the converted PWM duty value by lowering the converted PWM duty value according to the PWM duty correction amplitude when the sudden fluctuation is detected by the power supply voltage sudden fluctuation detection unit (fifth configuration).

Alternatively, the fifth configuration includes a ramp generator that performs a ramp control to return the PWM duty value to a value prior to correction and with a predetermined slope after the PWM duty value is corrected (sixth configuration).

Alternatively, in any of the first to sixth configurations, the power supply voltage sudden fluctuation detector detects the sudden fluctuation when the power supply voltage is switched from off to on (seventh configuration).

Alternatively, in any of the first to seventh configurations, the motor is a three-phase brushless DC motor (eighth configuration).

A motor system according to another embodiment of the disclosure includes the motor driving device of any of the configurations above, and a motor driven by the motor driving device.

Effects of the Present Disclosure

The motor driving device of the disclosure is capable of inhibiting unstable driving of a motor even in the occurrence of a sudden fluctuation of a power supply voltage.

DETAILED DESCRIPTION OF THE EMBODIMENTS

Details of the exemplary embodiments of the disclosure are given with the accompanying drawings below.

First Embodiment

Figure 1:
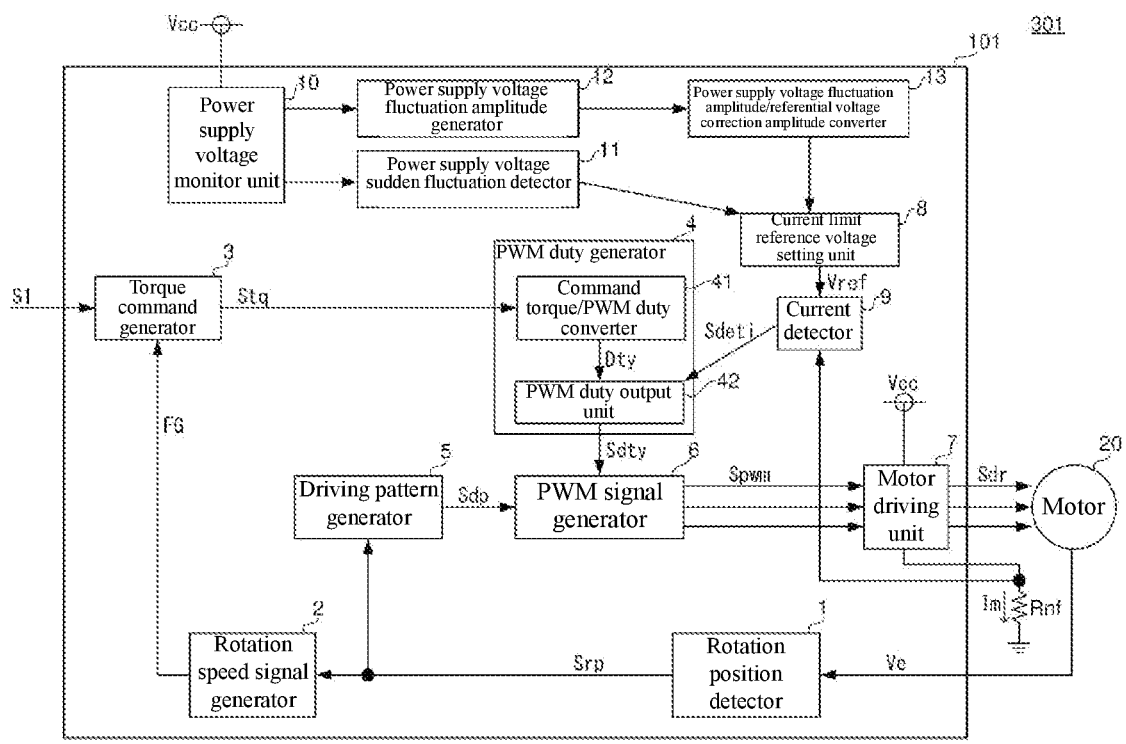
FIG. 1 is a block diagram of an overall configuration of a motor system according to a first embodiment of the disclosure.

Referring to FIG. 1, an overall configuration of a motor system according to a first embodiment of the disclosure is to be described below. FIG. 1 shows a block diagram of an overall configuration of a motor system 301 according to the first embodiment of the disclosure.

The motor system 301 shown in FIG. 1 includes a motor driving device 101 and a motor 20. The motor driving device 101 is a semiconductor device (IC package) that drives the motor 20 by a configuration to be described later.

The motor 20 is a three-phase brushless DC motor, and includes U-phase, V-phase, W-phase coils and permanent magnets (not shown) in a star connection. The number of poles of the motor 20 is not specifically limited, and is, for example, 4. Moreover, for example, the motor system 301 may be equipped in a server device, and the motor 20 is a fan motor.

The motor driving device 101 includes a rotation position detector 1, a rotation signal generator 2, a torque command generator 3, a pulse-width modulation (PWM) duty generator 4, a PWM signal generator 6 and a motor driving unit 7. The motor driving device 101 further includes external terminals for inputting and outputting various signals, including a speed command signal S1, a driving signal Sdr and a sensing signal Ve to be described shortly, from and to an exterior, and an external terminal connected to an application end of a power supply voltage Vcc or an external current detection resistor Rnf.

The motor driving device 101 performs a driving control on the motor 20 by means of sine wave driving (180-degree energization). In addition, the motor driving device 101 performs a PWM driving on the motor 20.

The rotation position detector 1 generates a rotation position detection signal Srp indicating a rotation position of a rotor based on a sensing voltage (counter electromotive force) Ve generated in the motor 20. That is to say, the motor driving device 10 corresponds to sensor-less driving.

More specifically, for example, the rotation position detector 1 compares the sensing voltage Ve generated by an end of any of the U-phase, V-phase and W-phase coils in the star connection with a midpoint voltage generated in a common connection node of the three coils, and generates a periodically established rotation position detection signal Srp. The rotation position detection signal Srp is established each time the rotor rotates by a specific electrical angle of 60 degrees. The electrical angle may also be an angle other than 60 degrees.

Moreover, the motor driving device is not limited to being sensor-less, and may also, for example, correspond to driving of a sensor included in a Hall sensor.

The rotation signal generator 2 generates, based on the rotation position detection signal Srp, a rotation speed signal FG that is transformed according to every 180 degrees of a mechanical angle of the rotor, that is, every ½ rotation of the rotating electric motor 20. The rotation speed signal FG represents a rotation speed (the speed of rotation) of the motor 20. Moreover, the mechanical angle is not limited to being 180 degrees, and may be set as appropriate.

The torque command generator 3 outputs a torque command signal Stq based on the rotation speed signal FG and a speed command signal S1 input from the outside of the motor driving device 101. The speed command signal Si represents a target rotation speed, and may be, for example, a PWM signal or a DC voltage signal input from one line or may be a communication signal from two lines.

The PWM duty generator 4 generates and outputs a PWM duty output signal Sdty based on the torque command signal Stq. The PWM duty output signal Sdty indicates a PWM duty value.

More specifically, the PWM duty generator 4 includes a command torque/PWM duty converter 41 and a PWM duty output unit 42. The command torque/PWM duty converter 41 converts a command torque indicated by the input torque command signal Strq into its corresponding PWM duty value Dty. The PWM duty output unit 42 generates and outputs the PWM duty output signal Sdty based on the PWM duty value Dty, and a current detection signal Sdeti input by a current detector 9 to be described later.

A driving pattern generator 5 generates a driving pattern Sdp based on the rotation speed detection signal Srp. The driving pattern generator 5 includes, for example, a period detector, a waveform reader and a waveform memory (not shown). The waveform memory keeps waveform data of sine waves with a normalized amplitude. The waveform data of the sine waves is not limited to being complete sine waves, and may be such as pseudo sine waves.

The period detector measures and maintains a value of a period of the rotation position detection signal Srp. The waveform reader reads the waveform data from the waveform memory in a manner that the period of the rotation position detection signal Srp measured in the previous measurement corresponds to a specific electrical angle. Waveforms corresponding to the U-phase, V-phase and W-phase are output and read as the driving pattern Sdp.

The PWM signal generator 6 multiplies the driving pattern Sdp with the PWM duty output signal Sdty, and performs a pulse amplitude modulation on a result of the multiplication to generate a PWM signal Spwm corresponding to each of the U-phase, V-phase and W-phase.

The motor driving unit 7 generates driving signals (driving voltages) Sdr corresponding to the three phases based on the PWM signals Spwm corresponding to the three phases, and supplies the driving signals Sdr to the motor 20. Herein, the motor driving unit 7 includes, for example, a pre-driver and a bridge output stage (neither shown). The motor driving unit 7 is applied with a power supply voltage Vcc, and is further connected to the current detection resistor Rnf configured on the outside of the motor driving device 101. Moreover, the current detection resistor may also be built-in the motor driving device.

Figure 2:
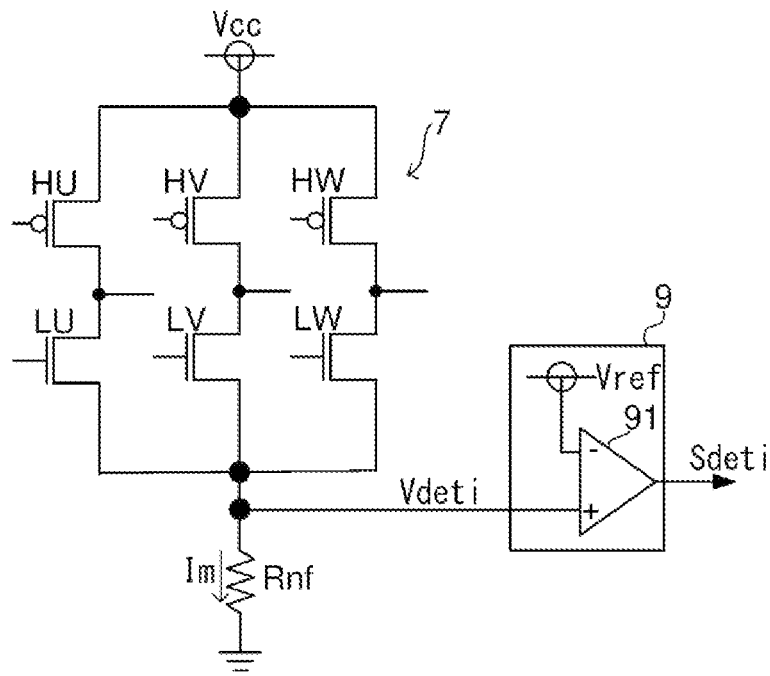
FIG. 2 is a diagram of an example of a configuration for detecting a motor driving current.

Herein, FIG. 2 depicts a configuration example in which the motor driving unit 7 includes the bridge output stage. In the configuration in FIG. 2, the bridge output stage of each of the U-phase, V-phase and W-phase is connected in parallel between the application end of the power supply voltage Vcc and one end of the current detection resistor Rnf. The other end of the current detection resistor Rnf is connected to an application end of a ground voltage.

The U-phase bridge output stage is formed by a high-side positive metal oxide semiconductor (PMOS) transistor HU and a low-side negative metal oxide semiconductor (NMOS) transistor LU connected in series. The V-phase bridge output stage is formed by a high-side PMOS transistor HV and a low-side NMOS transistor LV connected in series. The W-phase bridge output stage is formed by a high-side PMOS transistor HW and a low-side NMOS transistor LW connected in series. The pre-driver (not shown) switches the corresponding bridge output stage based on the PWM signal Spwm.

A driving signal Sdr for the U-phase is output from a node connecting the PMOS transistor HU and the NMOS transistor LU. A driving signal Sdr for the V-phase is output from a node connecting the PMOS transistor HV and the NMOS transistor LV. A driving signal Sdr for the W-phase is output from a node connecting the PMOS transistor HW and the NMOS transistor LW.

The driving signal Sdr corresponding to each of the U-phase, V-phase and W-phase is applied to one end of a coil of each of the phases of the motor 20. Thus, a motor driving current Im flows through the motor 20 and accordingly drives the motor 20.

As shown in FIG. 2 (FIG. 1), the motor driving current Im flows through the current detection resistor Rnf. The motor driving current Im undergoes current/voltage (I/V) conversion through the current detection resistor Rnf and is converted into the current detection voltage signal Vdeti.

As shown in FIG. 2, the current detector 9 includes a comparator 91. The current detection voltage signal Vdeti is applied to a non-inverting input terminal of the comparator 91. A current limit reference voltage Vref is applied to an inverting input terminal of the comparator 91. As shown in FIG. 1, the current limit reference voltage Vref is set by a current limit reference voltage setting unit 8. The current limit reference voltage setting unit 8 is implemented by, for example, a digital-to-analog converter (DAC). The current limit reference voltage Vref indicates a current limit value, and the current limit reference voltage setting unit 8 is equivalent to a current limit setting unit.

The comparator 91 compares the current detection voltage signal Vdeti with the current limit reference voltage Vref. The comparator 91 outputs a current detection signal Sdeti at a low level when the current detection voltage signal Vdeti is lower than the current limit reference voltage Vref. The comparator 91 outputs a current detection signal Sdeti at a high level when the current detection voltage signal Vdeti is higher than the current limit reference voltage Vref. That is to say, the current detector 9 detects whether the motor driving current Im exceeds a current limit value.

When the current detection signal Sdeti is at a high level, the PWM duty output unit 42 sets the PWM duty output signal Sdty in a direction for lowering the duty value. Thus, when the motor driving current Im exceeds the current limit value corresponding to the current limit reference value Vref, a control of inhibiting the motor driving current Im can be performed.

Moreover, the current detection resistor Rnf may also be configured between the application end of the power supply voltage Vcc and a high-side MOS of the bridge output stage. In this case, a voltage signal corresponding to the motor driving current Im is generated between two ends of the current detection resistor Rnf.

In addition, as shown in FIG. 1, the motor driving device 101 further includes a power supply voltage monitor unit 10, a power supply voltage sudden fluctuation detector 11, a power supply voltage sudden fluctuation amplitude generator 12 and a power supply voltage fluctuation amplitude/referential voltage correction amplitude converter 13.

The power supply voltage monitor unit 10 is implemented by, for example, an analog-to-digital converter (ADC), and monitors the power supply voltage Vcc.

The power supply voltage sudden fluctuation detector 11 monitors at a fixed interval the power supply voltage Vcc monitored by the power supply voltage monitor unit 10, and detects whether a sudden fluctuation in a rising direction of the power supply voltage Vcc has occurred. For example, the power supply voltage sudden fluctuation detector 11 determines that a sudden fluctuation in the rising direction of the power supply voltage Vcc has occurred when it is determined that a fluctuation amplitude (the amount of fluctuation) of the power supply voltage Vcc having a fixed period exceeds a predetermined threshold, wherein the fluctuation amplitude is used as a sampling amplitude of the ADC.

The power supply voltage fluctuation amplitude generator 12 monitors at a fixed interval the power supply voltage Vcc monitored by the power supply voltage monitor unit 10, and detects the fluctuation amplitude of the power supply voltage Vcc. For example, the power supply voltage fluctuation amplitude generator 12 detects the fluctuation amplitude of the power supply voltage Vcc having a fixed period, wherein the fluctuation amplitude used as the sampling amplitude of the ADC.

The power supply voltage fluctuation amplitude/referential voltage correction amplitude converter 13 converts the power supply voltage fluctuation amplitude detected by the power supply voltage fluctuation amplitude generator 12 into a referential voltage correction amplitude for correcting the current limit reference voltage Vref. The conversion is performed in a way that the referential voltage correction amplitude increases as the power supply voltage fluctuation amplitude gets larger.

When the power supply voltage sudden fluctuation detector 11 detects the sudden fluctuation in the rising direction of the power supply voltage, the current limit reference voltage setting unit 8 corrects the current limit reference voltage Vref according to the referential voltage correction amplitude converted by the power supply voltage fluctuation amplitude/referential voltage correction amplitude converter 13. The correction at this point is correction for the current limit reference voltage Vref to be lower than a predetermined normal value. That is to say, it is equivalent to correction for the current limit value to be lower than the normal value.

Figure 3:
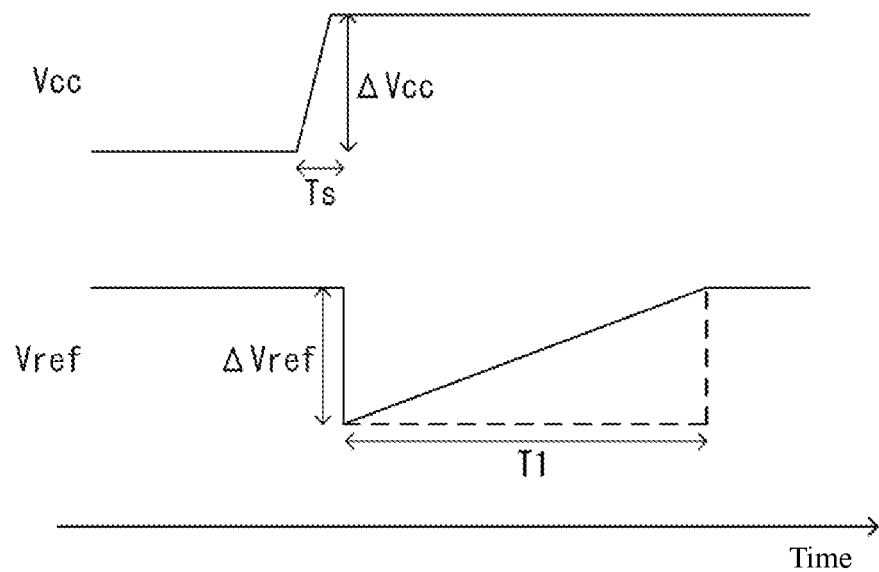
FIG. 3 is a brief waveform diagram of behaviors in the event of a sudden fluctuation of a power supply voltage according to the first embodiment.

FIG. 3 is for illustrating brief waveforms of behaviors corresponding to a sudden fluctuation of the power supply voltage Vcc. FIG. 3 depicts waveforms of the power supply voltage Vcc and the current limit reference voltage Vref.

FIG. 3 indicates a situation with the occurrence of a sudden fluctuation in the rising direction of the power supply voltage Vcc, and in which a fluctuation amplitude ΔVcc of the power supply voltage of a fixed period Ts detected by the power supply voltage sudden fluctuation detector 11 exceeds a predetermined threshold. Moreover, the fluctuation amplitude ΔVcc is detected by the power supply voltage fluctuation amplitude generator 12. In this case, the current limit reference voltage setting unit 8 may perform the correction by means of lowering the current limit reference voltage Vref by a correction amplitude ΔVref converted according to the fluctuation amplitude ΔVcc by the power supply voltage fluctuation amplitude/referential voltage correction amplitude converter 13 from the normal value. Then, the current limit reference voltage Vref is returned to the normal value with a predetermined slope over a period of time (Vref in FIG. 3). That is to say, a ramp control is performed.

Thus, even in the occurrence of a sudden fluctuation in the rising direction of the power supply voltage Vcc, an increase in the motor driving current Im can be inhibited. Therefore, unstable motor driving shifted from a normal status can be inhibited and minimized. Moreover, an overcurrent of the motor driving current Im can be inhibited.

In particular, for example, when the power supply voltage Vcc is switched from on to off, the power supply voltage Vcc may not be completely lowered because of a regenerative current generated by the motor 20, and the motor driving device 101 may continue to operate. During the operation period in which the power supply voltage Vcc is switched from off to on and then activated, a sudden fluctuation in the rising direction of the power supply voltage Vcc is generated. However, as described above, unstable motor driving can be inhibited.

In addition, for example, the following situations can also be handled, including a sudden fluctuation in the power supply voltage Vcc caused by instability of a power supply module that generates the power supply voltage Vcc, or a sudden fluctuation in the power supply voltage Vcc caused by switching of a reserve power supply.

Moreover, as shown in FIG. 3, after the current limit reference voltage Vref corresponding to the sudden fluctuation of the power supply voltage Vcc has been corrected, the current limit reference voltage Vref can be fixed to a value after the correction in a predetermined period T1, or the current limit reference voltage Vref can be returned to the normal value (the dotted line of Vref in FIG. 3) after the predetermined period T1 has elapsed.

Second Embodiment

The second embodiment of the disclosure is described below. The description below is given from a perspective different from that of the first embodiment.

Figure 4:
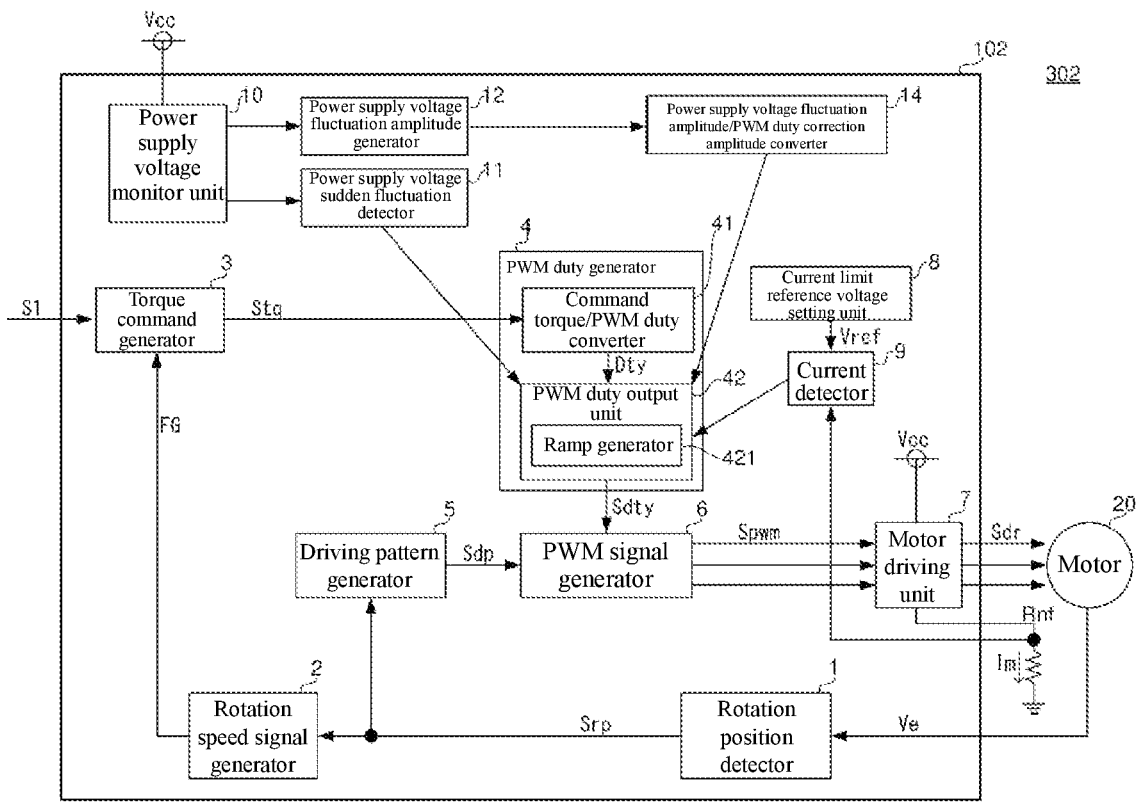
FIG. 4 is a block diagram of an overall configuration of a motor system according to a second embodiment of the disclosure.

FIG. 4 shows a block diagram of an overall configuration of a motor system 302 according to the second embodiment of the disclosure. The motor system 302 includes a motor driving device 102 and a motor 20.

The configuration of the motor driving system 102 differs from that of the first embodiment (FIG. 1) in terms of an internal configuration including the PWM duty generator 4 and a power supply voltage fluctuation amplitude/PWM duty correction amplitude converter 14.

A detection result of the power supply voltage sudden fluctuation detector 11 is output to the PWM duty output unit 42 included in the PWM duty generator 4. The power supply voltage fluctuation amplitude/PWM duty correction amplitude converter 14 converts a fluctuation amplitude of the power supply voltage Vcc detected by the power supply voltage fluctuation amplitude generator 12 into a PWM duty correction amplitude. The conversion is performed in a way that the PWM duty correction amplitude increases as the power supply voltage fluctuation amplitude gets larger.

When a sudden fluctuation in the rising direction of the power supply voltage Vcc is detected by the power supply voltage sudden fluctuation detector 11, the PWM duty output unit 42 corrects the PWM duty value Dty converted by the command torque/PWM duty converter 41 according to the PWM duty correction amplitude converted by the power supply voltage fluctuation amplitude/PWM duty correction amplitude converter 14, and outputs the corrected PWM duty value Dty as the PWM duty output signal Sdty. The correction at this point is correction for lowering the PWM duty value Dty.

Moreover, the PWM duty output unit 42 includes a ramp generator 421. The ramp generator 421 performs a ramp control to return the PWM duty value after correction to a PWM duty value prior to the correction with a predetermined slope.

Figure 5:
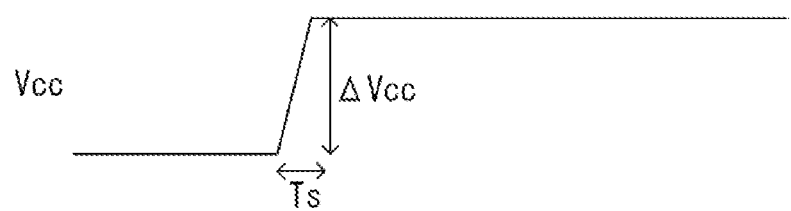
FIG. 5 is a brief waveform diagram of behaviors in the event of a sudden fluctuation of a power supply voltage according to the second embodiment.
Figure 5:
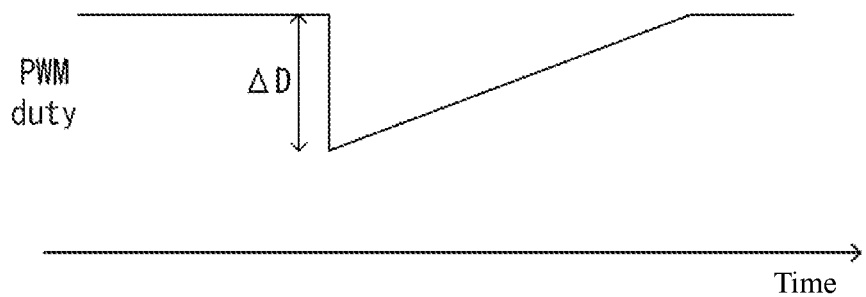

FIG. 5 is for illustrating brief waveforms of behaviors corresponding to a sudden fluctuation of the power supply voltage Vcc. FIG. 5 depicts waveforms of the power supply voltage Vcc, and the PWM duty value shown by the PWM duty output signal Sdty.

FIG. 5 indicates a situation with the occurrence of a sudden fluctuation in the rising direction of the power supply voltage Vcc, and in which a fluctuation amplitude ΔVcc of the power supply voltage Vcc of a fixed period Ts detected by the power supply voltage sudden fluctuation detector 11 exceeds a predetermined threshold. Moreover, the fluctuation amplitude ΔVcc is detected by the power supply voltage fluctuation amplitude generator 12. In this case, the PWM duty output unit 42 performs the correction by means of by lowering the PWM duty value Dty converted by the command torque/PWM duty converter 41 by the PWM duty correction amplitude ΔD converted by the power supply voltage fluctuation amplitude/PWM duty correction amplitude converter 14 according to the fluctuation amplitude ΔVcc. Then, the PWM duty value is returned to a value prior to the correction (PWM duty value Dty) with a predetermined slope.

Thus, even in the occurrence of a sudden fluctuation in the rising direction of the power supply voltage Vcc, an increase in the motor driving current Im can be inhibited and minimized by performing the correction by means of lowering the PWM duty value according to the power supply voltage fluctuation amplitude, hence achieving the same effects as in the first embodiment. Moreover, the motor driving can be returned to a normal state as quickly as possible by means of the ramp control performed by the ramp generator 421 on the PWM duty value.

Other

Further, in addition to the embodiments, various modifications may be applied to the technical features disclosed by the present disclosure without departing from the scope of the technical inventive subject thereof. That is to say, it should be understood that all aspects of the embodiment are exemplary rather than limiting, and it should also be understood that the technical scope of the present disclosure is not limited to the embodiment, but includes all equivalent meanings of the scope of the claims and all modifications within the scope.

For example, a driving target of the motor driving device of the disclosure is not limited to a three-phase brushless DC motor, and may be, for example, a single-phase brushless motor.

INDUSTRIAL APPLICABILITY

The disclosure may be implemented in a motor system mounted on various machines.

The invention claimed is:

1. A motor driving device, comprising:
    a PWM duty generator, generating a PWM duty value based on a torque command signal according to a speed command signal;
    a PWM signal generator, generating a PWM signal based on the generated PWM duty value;
    a motor driving unit, to which a power supply voltage is supplied, and a drive signal is generated based on the generated PWM signal and supplied to a motor;
    a current detector, detecting whether a motor driving current flowing through the motor exceeds a current limit value;
    a power supply voltage sudden fluctuation detector, detecting a sudden fluctuation in a rising direction of the power supply voltage;
    a power supply voltage fluctuation amplitude generator, detecting a fluctuation amplitude of the power supply voltage; and
    a current limit value setting unit, correcting the current limit value by means of lowering the current limit value by a correction amplitude that corresponds to the fluctuation amplitude of the detected power supply voltage from a normal value when the sudden fluctuation is detected by the power supply voltage sudden fluctuation detection unit, wherein
    the PWM duty generator generates the PWM duty value according to a detection result by the current detector.

2. The motor driving device of claim 1, wherein
    the current detector compares a voltage signal converted from the motor driving current based on current/voltage conversion with a current limit reference voltage,
    the motor driving device further includes a power supply voltage fluctuation amplitude/referential voltage correction amplitude converter that converts the fluctuation amplitude of the detected power supply voltage into a referential voltage correction amplitude, and
    the current limit value setting unit corrects the current limit reference voltage according to the referential voltage correction amplitude.

3. The motor driving device of claim 1, wherein after correction, the current limit value is returned to the normal value with a predetermined slope over a period of time.

4. The motor driving device of claim 2, wherein after correction, the current limit value is returned to the normal value with a predetermined slope over a period of time.

5. The motor driving device of claim 1, wherein the current limit value is set to be constant at a corrected value in a predetermined period after correction.

6. The motor driving device of claim 2, wherein the current limit value is set to be constant at a corrected value in a predetermined period after correction.

7. The motor driving device of claim 1, wherein the power supply voltage sudden fluctuation detector detects the sudden fluctuation when the power supply voltage is switched from off to on.

8. The motor driving device of claim 2, wherein the power supply voltage sudden fluctuation detector detects the sudden fluctuation when the power supply voltage is switched from off to on.

9. The motor driving device of claim 1, wherein the motor is a three-phase brushless DC motor.

10. The motor driving device of claim 2, wherein the motor is a three-phase brushless DC motor.

11. A motor system, comprising:
    the motor driving device of claim 1; and
    a motor, driven by the motor driving device.

12. A motor system, comprising:
    the motor driving device of claim 2; and
    a motor, driven by the motor driving device.

13. A motor driving device, comprising:
    a PWM duty generator, generating a PWM duty value based on a torque command signal according to a speed command signal;
    a PWM signal generator, generating a PWM signal based on the generated PWM duty value;
    a motor driving unit, to which a power supply voltage is supplied, and a drive signal is generated based on the generated PWM signal and supplied to a motor;
    a power supply voltage sudden fluctuation detector, detecting a sudden fluctuation in a rising direction of the power supply voltage;
    a power supply voltage fluctuation amplitude generator, detecting a fluctuation amplitude of the power supply voltage; and
    a power supply voltage fluctuation amplitude/PWM duty correction amplitude converter, converting the fluctuation amplitude of the detected power supply voltage into a PWM duty correction amplitude, wherein
    the PWM duty generator includes:
        a command torque/PWM duty converter, converting a command torque indicated by the torque command signal into the PWM duty value;
        a PWM duty output unit, correcting the converted PWM duty value by lowering the converted PWM duty value according to the PWM duty correction amplitude when the sudden fluctuation is detected by the power supply voltage sudden fluctuation detection unit.

14. The motor driving device of claim 13, further comprising a ramp generator that performs a ramp control to return the PWM duty value to a value prior to correction and with a predetermined slope after the PWM duty value is corrected.

15. The motor driving device of claim 13, wherein the power supply voltage sudden fluctuation detector detects the sudden fluctuation when the power supply voltage is switched from off to on.

16. The motor driving device of claim 14, wherein the power supply voltage sudden fluctuation detector detects the sudden fluctuation when the power supply voltage is switched from off to on.

17. The motor driving device of claim 13, wherein the motor is a three-phase brushless DC motor.

18. The motor driving device of claim 14, wherein the motor is a three-phase brushless DC motor.

19. A motor system, comprising:
    the motor driving device of claim 13; and
    a motor, driven by the motor driving device.

20. A motor system, comprising:
the motor driving device of claim 14; and
a motor, driven by the motor driving device.

\* \* \* \* \*